United States Patent [19]
Tausheck

[11] 3,765,550
[45] Oct. 16, 1973

[54] DOLLY FOR LIFTING AND TRANSPORTING AND INSTALLING LARGE SHEETS OF FLAT GLASS AND OTHER FLAT SHEET PRODUCTS

[75] Inventor: Russell W. Tausheck, Hayward, Calif.

[73] Assignee: Ace Glass Co., Hayward, Calif.

[22] Filed: Aug. 5, 1971

[21] Appl. No.: 169,415

[52] U.S. Cl. .............. 214/77, 214/1 SW, 214/1 BV
[51] Int. Cl. .............................................. B60p 1/14
[58] Field of Search ................. 214/1 D, 1 BV, 1 H, 214/1 SW, 1 S, 130 R, 7, 77

[56] References Cited
UNITED STATES PATENTS
| | | | |
|---|---|---|---|
| 2,418,586 | 4/1947 | Jenkins | 214/1 D |
| 3,138,265 | 6/1964 | Hansen | 214/1 S |
| 3,361,280 | 1/1968 | Traver | 214/1 SW X |

FOREIGN PATENTS OR APPLICATIONS
| | | | |
|---|---|---|---|
| 658,431 | 2/1963 | Canada | 214/1 S |

Primary Examiner—Gerald M. Forlenza
Assistant Examiner—Frank E. Werner
Attorney—William R. Piper

[57] ABSTRACT

A dolly for lifting and transporting and installing large sheets of flat glass or other flat sheet products and comprising an elongated frame with a guideway for receiving an edge of the glass, the bottom of the guideway being provided with spaced apart hard rubber rollers that can rotate to permit the flat glass to be moved on or off of the guideway. The dolly has a centrally disposed and upwardly extending mast that is pivotally connected to the dolly and can be swung laterally through an angle of about 27°. A glass supporting frame is slidably and pivotally mounted on the mast and can be raised and lowered on the mast by means of a manually operated or electric winch and cable. The glass supporting frame has an arm mounted at its free end and extending in the direction of the length of the elongated dolly frame. This arm removably carries a vacuum cup at each end designed to grip and support a flat glass sheet. It is possible to pull a flat sheet of glass onto the dolly from an end of the guideway. It is also possible to swing the mast laterally in order to position the vacuum cups on the glass lifting frame at the desired locations on the side of the sheet of glass whereupon the vacuum cups may be secured to the glass sheet and the winch actuated for lifting the glass and depositing it on the dolly.

9 Claims, 10 Drawing Figures

INVENTOR.
RUSSELL W. TAUSHECK
BY
William R. Piper
ATTORNEY

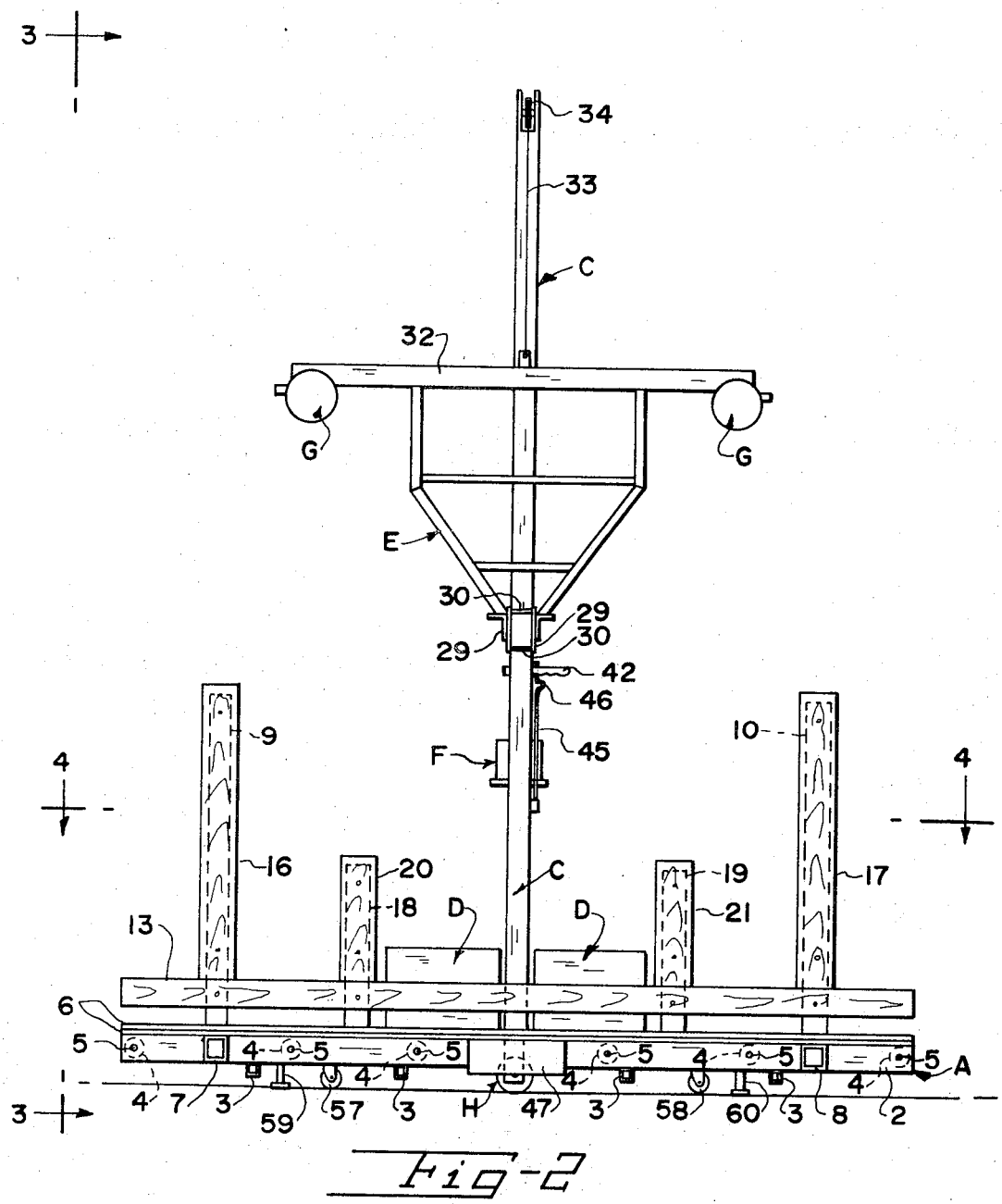

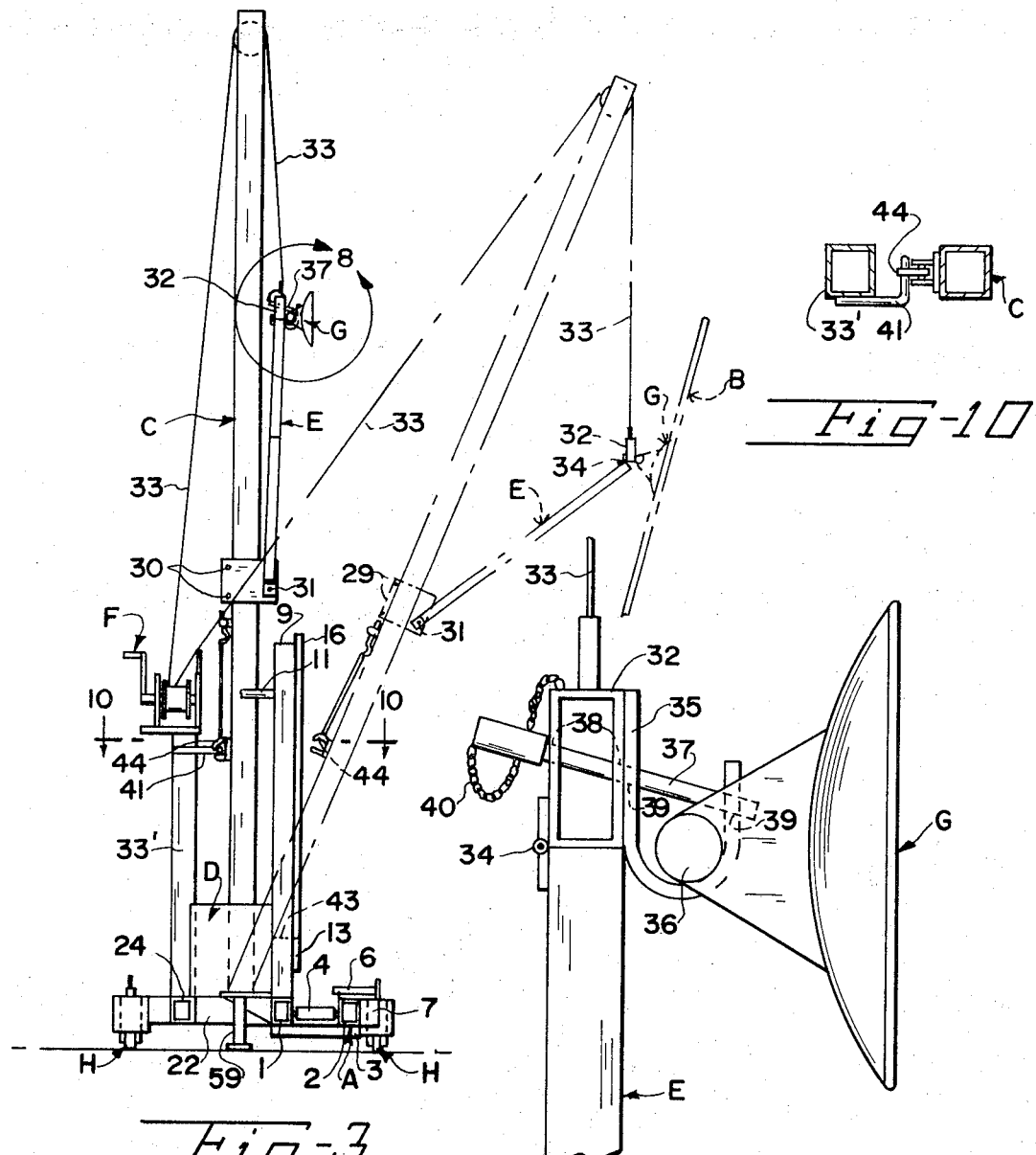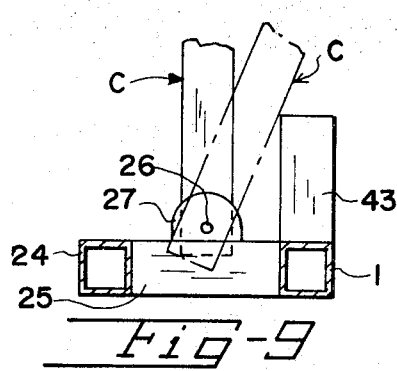

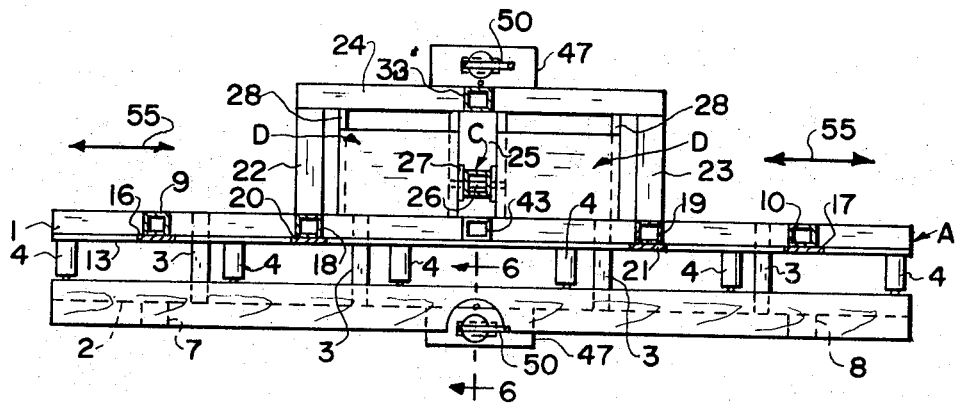
Fig-4
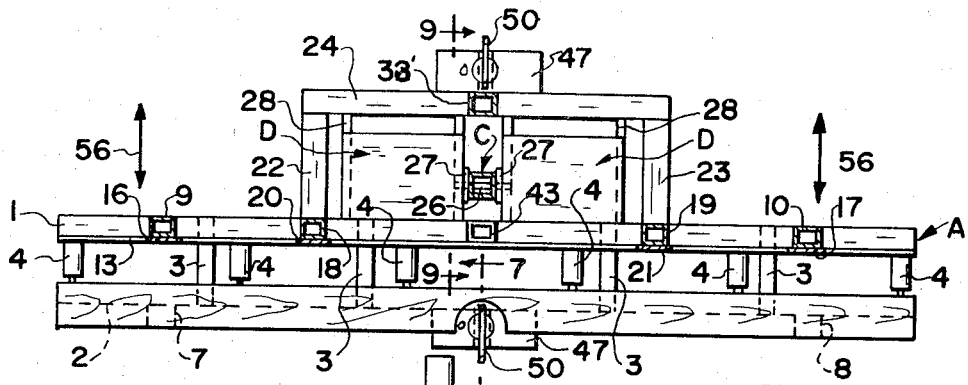
Fig-5
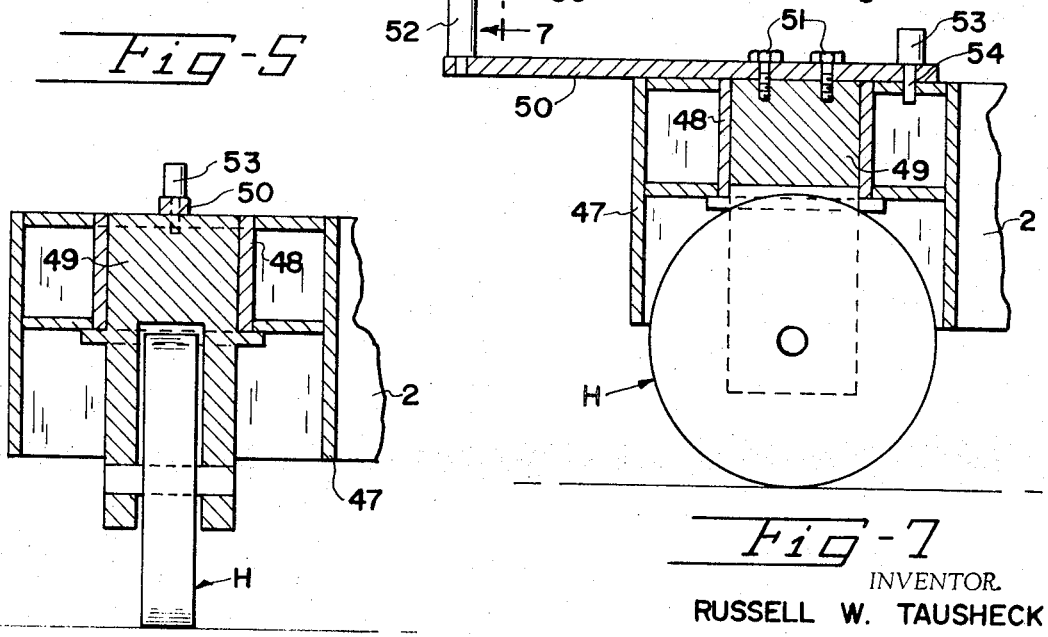
Fig-6
Fig-7
INVENTOR.
RUSSELL W. TAUSHECK
BY
William K. Piper
ATTORNEY 3,765,550

DOLLY FOR LIFTING AND TRANSPORTING AND INSTALLING LARGE SHEETS OF FLAT GLASS AND OTHER FLAT SHEET PRODUCTS

BACKGROUND OF THE INVENTION

1. Field of the Invention

Large sheets of flat glass usually require two to six men to handle when moving the glass from one place to another. This operation is presently accomplished by lifting the glass sheets by hand and using flat rubber pads or gloves for protection. I have designed a dolly and a sheet glass lifting mechanism that will permit one man to lift and transport large sheets of glass with much more safety to the operator compared to the present method. The elongated dolly can be moved in the direction of its length or in a lateral direction and it can be swung about in a circle having a diameter no greater than its length. The dolly is provided with safety floor locks that will prevent the accidental moving of the dolly over the supporting surface when lifting a sheet of glass onto or when removing the sheet from the dolly. From the dolly, sheets of glass may be placed on a truck or onto a tilting cutting table or can be positioned in an opening for installation at a construction site.

2. Description of the Prior Art

The U.S. Pat. No. 3,051,331, issued Aug. 28, 1962 to Andre Schram, on a device for handling sheet material, discloses suction cups mounted on a frame that has an inclined front face with a horizontal bar at its base on which the lower edge of a flat sheet of glass may rest. Modified forms of the patented device illustrate that the suction cups can be moved forwardly to contact with the pane of glass and then vacuum can be applied to the suction cups for attaching them to the glass after which the suction cups can be moved upwardly and rearwardly for positioning the sheet of glass against the inclined uprights of the frame so as to be supported in an inclined position by the horizontal bar.

The patentee does not disclose an elongated guideway for the sheet of glass in which transversely extending hard rubber rotatable rollers slidably support the lower edge of the glass that is received in the guideway. Also, the patentee does not disclose a dolly with a centrally disposed and upwardly extending mast that is pivotally connected to the dolly frame so as to be swingable laterally through an arc, the mast slidably and pivotally supporting a glass lifting frame that has vacuum cups for attaching to the side of a pane of glass so as to lift the pane onto the dolly and vice versa.

SUMMARY OF THE INVENTION

An object of my invention is to provide a dolly for the safe lifting and transporting of large sheets of flat glass that will permit a single operator to safely load and unload the sheet of glass onto and off from the dolly without the aid of any other person. The transporting of the sheet of glass while it is on the dolly can be accomplished by the same operator without any help. The dolly and the glass lifting mechanism are designed to provide safety for the operator while he is operating the glass lifting mechanism or while moving the dolly from one place to another whether inside a warehouse or at a building site.

A further object of my invention is to provide a dolly that is especially designed for permitting an operator to pull a flat sheet of glass from an open end of a case of glass and to pull the glass sheet directly onto the dolly which has previously been positioned so as to align its elongated glass-receiving guideway with the length of the pane of glass. Also, the glass-lifting mechanism on the dolly has been designed to lift and remove a loosened case lid from a case of glass and then to engage with the side of the exposed pane of flat glass and to lift it away from the case and deposit it on the dolly for transporting to the desired location. Glass sheets may also be packed into a case-by reversing the sequence just mentioned. The lifting mechanism is so designed as to position the operator on the opposite side of the dolly from the side supporting the pane of glass. In this way the operator is protected.

BRIEF DESCRIPTION OF THE DRAWINGS

FIG. 2 is a front elevation of the device without supporting a sheet of flat glass.

FIG. 3 is an end elevation of the device when looking from the left hand end of FIG. 2 in the direction of the arrows 3—3 in FIG. 2.

FIG. 4 is a horizontal section taken along the line 4—4 of FIG. 2. The main central support wheels have been positioned to permit the dolly to move in the direction of its length as indicated by the double arrows in FIG. 4.

FIG. 5 is a view similar to FIG. 4, but shows the main central support wheels swung about their vertical axes through arcs of 90° to permit the dolly to be moved laterally in either direction as indicated by the double arrows in FIG. 5.

FIG. 6 is an enlarged vertical transverse section taken along the line 6—6 of FIG. 4 and illustrates one type of support for the main central support wheel that will permit the wheel to be swung about a vertical axis through an arc of 90° and secured against any accidental further rotation about the vertical axis in either direction.

FIG. 7 is a view similar to FIG. 6, but shows the main central support wheel rotated about its vertical axis through an arc of 90° from that illustrated in FIG. 6. FIG. 7 is an enlarged vertical transverse section taken along the line 7—7 of FIG. 5.

FIG. 8 is an enlarged view of the circled portion 8 in FIG. 3 and illustrates the manner of removably mounting a standard suction cup on the end of the lifting arm used in lifting flat glass sheets. Two suction cups are used, one being mounted at each end of the arm.

FIG. 9 is a vertical transverse section taken along the line 9—9 of FIG. 5 and illustrates the pivotal mounting for the mast.

FIG. 10 is a horizontal section taken along the line 10—10 of FIG. 3 and illustrates the catch mechanism used in holding the mast in a vertical position.

DESCRIPTION OF THE PREFERRED EMBODIMENT

Figure 1:
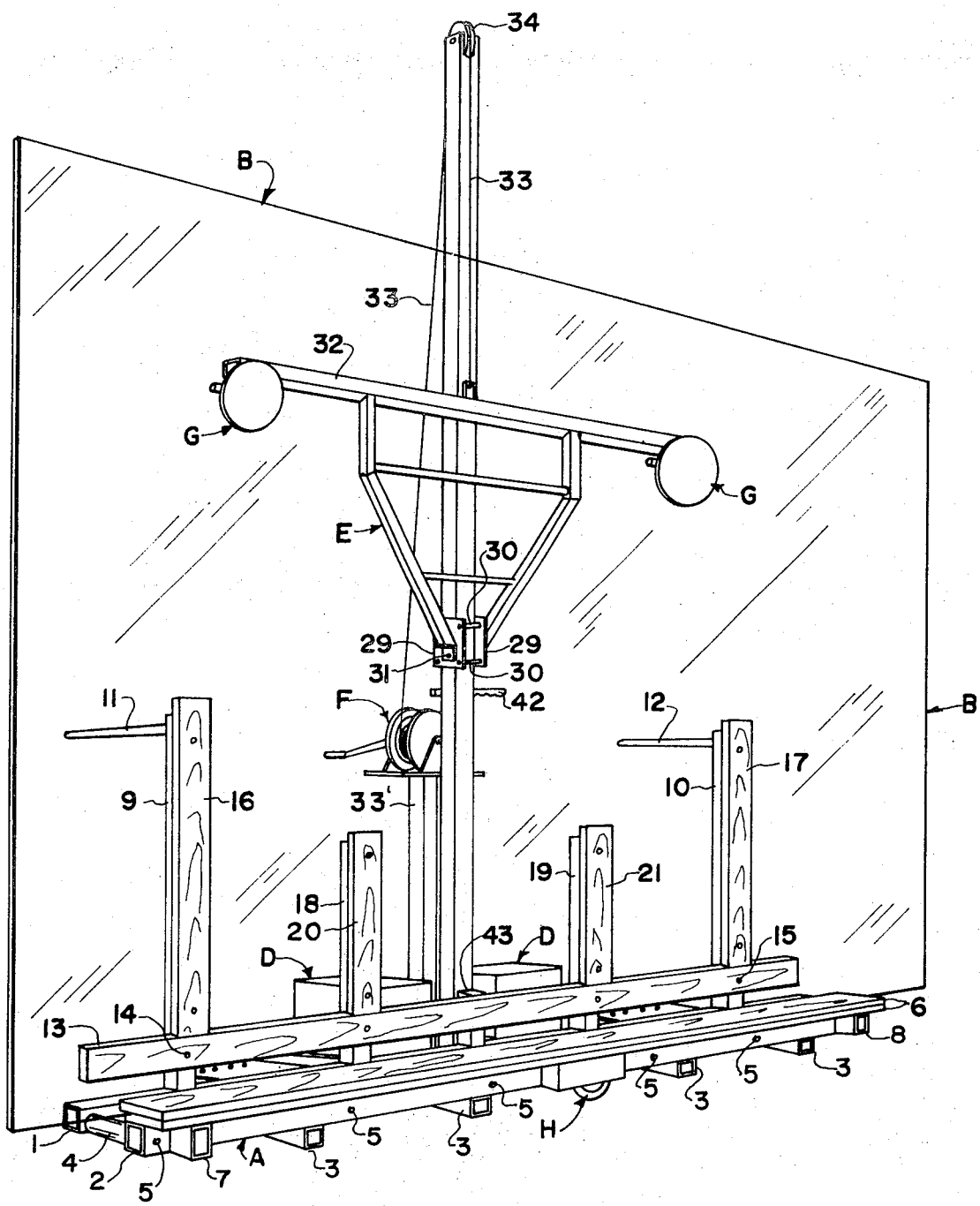
FIG. 1 is a perspective view of the dolly and the glass lifting mechanism and illustrates a large flat sheet of glass resting on the dolly.

In carrying out my invention, I provide a dolly frame indicated generally at A in FIGS. 1-5, inclusive. The frame preferably is formed from two parallelly arranged and spaced apart tubular members 1 and 2 that are rectangular in cross section. Transversely extending and spaced apart connecting tubular members 3, see FIG. 2, are welded to the undersides of the elongated and spaced apart tubular members 1 and 2. The spaced apart tubular members 1 and 2 rotatably support a plurality of spaced apart and transversely extending hard rubber rollers 4 that cooperate with the tubular members 1 and 2 for providing an elongated guideway for receiving and supporting the lower edge of a large flat sheet of glass B, see FIG. 1. The hard rubber rollers 4 rotate on axles 5 that are supported by the elongated tubular members 1 and 2.

The elongated guideway for the lower edge of the flat sheet of blass B is provided with two superimposed strips of wood 6 that are supported by the tubular member 2, see FIG. 1. The inner edge of the upper wood strip 6 is spaced inwardly a slight distance so as to prevent the lower edge of the flat glass sheet from contacting the metal tubular member 2, see FIG. 3. It will be seen from FIG. 1 that both of the wooden strips 6 are wider than the width of the supporting tubular metal member 2, and I therefore provide additional supports consisting of short tubular lengths 7 and 8 that are welded to the outer side of the elongated tubular member 2 and have their upper surfaces lying flush with the upper surface of the tubular member 2.

The other elongated tubular member 1 is provided with two metal tubular uprights 9 and 10, see FIG. 1, that are rectangular in cross section, see FIGS. 4 and 5, and have their lower ends welded to the member 1. Handles 11 and 12 are mounted near the tops of the uprights 9 and 10, respectively, and extend in a lateral direction, as shown in FIG. 1. The uprights 9 and 10 are positioned near the ends of the tubular member 1 and the handles 11 and 12 are placed in a position where either one may be readily grasped by the operator when he desires to move the dolly. An elongated wooden guide rail 13 parallels the tubular member 1 and is spaced above it and is secured to the uprights 9 and 10 by bolts 14 and 15, or other suitable fastening means. Also, upstanding wooden strips 16 and 17 are secured to the metal tubular uprights 9 and 10, respectively, and the lower ends of the strips abut the upper edge of the horizontal wooden guide rail 13. Additional shorter uprights 18 and 19 are placed between the end uprights 9 and 10 and a central mast C, and their lower ends are welded to the tubular member 1. These shorter uprights 18 and 19 are provided with wooden strips 20 and 21, respectively, that extend upwardly from the horizontal strip 13. All of these wooden strips 13, 16, 17, 20 and 21, lie in the same vertical plane and provide a side support for the flat glass pane B when it is lifted, whose lower edge rests on the rubber rollers 4.

I will now describe the apparatus for lifting a flat sheet of glass B onto and off from the dolly A. This apparatus includes the centrally disposed and upwardly extending mast C, see FIGS. 1, 2, 3 and 9. The dolly frame A has an offset portion that includes laterally extending metal tubular members 22 and 23 whose ends are welded to the elongated tubular member 1 so that they will extend at right angles thereto, see also FIGS. 4 and 5. The outer ends of the tubular members 22 and 23 are interconnected by another tubular member 24 that is welded in place and parallels the tubular member 1. A central tubular member 25 has its ends welded to the tubes 1 and 24 and it parallels the members 22 and 23. The lower end of the mast C is pivotally mounted on the member 25 by means of a pivot pin 26 that extends transversely through the mast and has its ends mounted in ears 27—27 that are welded to the central member 25, see FIGS. 4, 5, and 9. Any other type of pivotal connection between the mast C and the member 25 may be used. It might be well to mention here that the offset frame portion comprising the tubular members 22, 23, 24 and 25 also provide pockets for receiving counterweight blocks D—D, see FIGS. 1, 2 and 3. The blocks may rest on metal straps 28 that are welded to the tubular members 1 and 24.

The mast C slidably and pivotally carries a flat sheet glass lifting frame indicated generally at E in FIGS. 1, 2 and 3. A pair of plates 29—29 slidably contact opposite sides of the mast C and are held together by connecting bearing pins 30. The flat sheet glass lifting frame E is pivotally mounted on the plates 29—29 at 31. The frame E is in the form of an inverted A-frame whose apex is pivotally supported by the pin 31 and whose extremities hingedly support a sheet glass lifting tubular arm 32 that parallels the tubular members 1 and 2. A winch F (having an automatic braking mechanism) is mounted on a pedestal 33 that has its lower end welded to the horizontal tubular member 24 of the offset portion of the dolly frame A. The winch has a cable 33 that extends from the winch drum in an upward direction and is passed over a pulley 54 that is mountd at the top of the mast C and the end of the cable is connected to the arm 32 of the glass lifting frame E. The winch automatically locks at any position.

At each end of the sheet glass lifting arm 32, I removably mount a manually operated vacuum cup G of standard construction, see FIGS. 3 and 8. The tubular arm 32 is hinged at 34 to the upper extremities of the sheet glass lifting frame E. Hook-shaped members 35 are welded at each end of the arm 32 and FIG. 8 shows the vacuum cup G provided with a handle 36 that can be received by the hook 35 for supporting the vacuum cup. An inclined gravity movable pin 37 is receivable in openings 38—38 provided in the tubular arm 32, and in aligned openings 39—39 provided in the hook 35. When the pin 37 is in the position shown in FIG. 8, it will prevent the accidental freeing of the handle 36 for the vacuum cup G from the hook 35. The inclination of the pin 37 will prevent it from becoming accidentally freed from the hook. A chain 40 or other flexible member has one end connected to the arm 32 and its other end connected to the pin 37. This chain prevents the pin 37 from being completely freed from the openings 38 in the arm 32 and becoming lost. The vacuum cups carry means, not shown, for creating a vacuum in the cup G, while the cup is held against the pane of glass B. The vacuum is sufficient for the cup to remain attached to the glass and cause the cup to lift the glass when the frame E is lifted by means of the winch F and the cable 33. Only two vacuum cups are needed to lift large flat sheets of glass. At the end of the lifting and transporting operation, the vacuum in the cups can be released and the cups removed from the glass.

It is possible to swing the mast C about its pivot 26, see FIG. 9, when the operator wishes to swing the mast lateraly for bringing the vacuum cups G, into contact with the side of a flat sheet of glass B that is to be removed from a case containing a number of glass sheets. In FIGS. 3 and 10, I show the standard 33' provided with a hook 41 that extends toward the mast C. A hand grip 42, see also FIGS. 1 and 2, extends from the mast C and parallels the length of the tubular member 1. The operator grasps this handle 42 when swinging the mast C from the vertical full line position, shown in FIG. 3, into the inclined dot-dash line positon, shown in the same Figure. A short upwardly extending tubular stop member 43, see FIGS. 3, 4 and 9, has its lower end welded to the tubular member 1, and the mast C when swung laterally will strike the upper end of the stop member and will be prevented from swinging any farther in the same direction. The hook 41 on the standard 33 cooperates with a pivoted catch 44 that is carried by the mast C, and when the mast is in a vertical position, as in FIG. 3, the pivoted catch 44 will engage with the hook 41 and prevent any accidental swinging of the mast, see also FIG. 10. A latch release rod 45 has its lower end pivotally connected to the latch 44 and has its upper end slidably received in an opening provided in the hand grip 42. The release rod has an offset bend 46, see FIG. 2, that is positoned near to the hand grip 42 so that the operator can use a finger or thumb of the same hand that grips the hand grip 42 to engage with the offset 46 for lifting the latch release rod vertically for swinging the latch 44 away from the hook 41. In this way the operator has the swinging of the mast C under control at the time he frees the latch 44.

I will now describe how the dolly can be moved in any desired direction. At the center of the dolly frame A, I provide two main support wheels H, and since the structure of both is identical, a detailed description of one will suffice for both and like reference characters will be applied to similar parts. FIGS. 1, 2 and 3 show box-like housings 47 secured to the tubular member 2 of the dolly frame A and to the tubular member 24 of the offset portion of the frame, see FIGS. 4 and 5. In FIGS. 6 and 7, I illustrate one way of mounting the main support wheel H, so that it can be swung about a vertical axis for a purpose presently to be described. The housing 47 has a central cylindrical bearing 48 in which a vertical cylindrical shank 49 is rotatably mounted. The lower end of the shank 49 is bifurcated and rotatably carries the wheel H, see FIG. 6. An arm 50, see FIGS. 4, 5 and 7, is attached to the top of the shank 49 by bolts 51 and a hand grip 52 extends vertically from the free end of the arm. A stop pin 53 is supported at the other end of the arm and is receivable in either one of two openings 54 provided in the top of the housing 47. When the handles 50 for the two wheels H are swung into positons paralleling the tubular members 2 and 24 of the dolly frame A, the axes of the wheels H will extend at right angles to the tubular members and the wheels permit the dolly to move in the directions indicated by the double arrows 55 in FIG. 4. The stop pins 55 will enter the registering openings 54 and prevent any accidental swinging of the arms 50. If the operator wishes to move the dolly frame A in a lateral direction, he frees the stop pins 53 and swings the arms 50 into the positions shown in FIG. 5, whereupon the stop pins 53 are reinserted in their new positions and the dolly wheel H will permit the dolly to move laterally as indicated by the double arrows 56 in FIG. 5.

Referring again to FIGS. 2 and 3, I mount caster wheels 57 and 58 under the dolly frame A, and space them equal distances from the main support wheels H. These caster wheels permit the dolly to be swung around in a circle whose diameter is no longer than the length of the dolly when the support wheels H are in the position shown in FIG. 2. The dolly is also provided with standard safety floor locks, indicated generally at 59 and 60 in FIGS. 2 and 3. The type of floor lock that is preferably used is the one where a pedal, not shown, on the lock is depressed by the foot for causing the lock to contact the floor and prevent the dolly from moving.

OPERATION

From the foregoing description of the various parts of the device, the operation thereof may be readily understood. The dolly can be used for removing sheet glass from a case containing a number of sheets of flat glass. The case of sheet glass is set on one of its edges so tha the sheets of flat glass within the case are inclined only to a slight degree from a vertical plane. First the lid of the case can be removed. The operator can move the dolly near to the side of the case where the lid is to be removed. He then grasps the hand grip 42 for the mast C and with his thumb raises the release rod 45 by engaging the offset bend 46, see FIG. 2. This will swing the catch 44 free of the hook 41, see FIGS. 3 and 10, and the operator can swing the mast C toward the side of the lid. He also can operate the winch F for causing the cable 33 to raise or lower the frame E on the mast. The vacuum cups G are removed and the hooks 35 (or suction cup brackets) are used to hook onto a lid board for lifting the lid. The winch F is operated to raise the lid onto the dolly. The dolly is then moved away and carries the lid with it. The lower edge of the lid can rest on the wooden strips 6 during the transporting of the lid.

Then the operator returns the dolly to the case of flat sheet glass, not shown, and again swings the mast C and adjusts the frame E on the mast so that the vacuum cups G will be placed in the right position on the glass sheet. The operator stands on the left hand side of the dolly frame A during this operation, see FIG. 3, and the safety locks 59 have been depressed so as to hold the dolly from moving. The operator is on the safe side of the dolly and even though the mast C and the frame E are both swung to the right about their pivots 26 and 31, respectively, see also FIG. 9, the counterweights will prevent any lateral tipping of the dolly. The glass sheet B is elevated a slight distance after the suction cups G have been applied to the glass and the winch F has been operated to wind up the cable 33 for a short distance. The operator then breaks any suction between the glass sheet B, gripped by the suction cups and the next sheet of glass in the case.

The sheet of glass B may now be lifted away from the case of glass, not shown, the operator actuating the winch F for lifting the glass sheet B and swinging the mast C back into a vertical position where the latch 44 will engage with the hook 41, see FIGS. 3 and 10 for holding the mast from accidental swinging. The operator performs these operations while standing on the left hand side of the dolly in a safe position. The winch is operated for lowering the glass sheet B so that its lower edge will rest on the solid rubber rollers 4. The dolly may now be moved to any place desired and will transport the sheet of glass with it in the manner shown in FIG. 1. The above operations are reversed when transferring the sheet of glass from the dolly to the glass cutting table or to a truck, not shown, or to a window opening at a building site.

It is possible to use the dolly and pull a glass sheet endwise from a case containing glass sheets. Glass tongs, not shown, are used by the operator for gripping the sheet and then the operator can pull on the tongues for moving the glass sheet onto the dolly, the lower edge of the glass sheet travelling over and being supported by the hard rubber rollers 4. The dolly has been previously positioned so that the glass sheet guideway comprising the wooden strips 6 and the rollers 4 are in alignment with the length of the glass sheet B and the safety floor locks 59 have been moved into contact with the floor to prevent accidental movement of the dolly. After the glass sheet has been centered with respect to the rollers 4, the sheet is pulled onto the dolly and the suction cups G are applied to the glass. It is now possible to move the dolly with the glass sheet to the tilting cutting table or to the truck or to a window opening at a building site, not shown. The mast C can be tilted for moving the glass sheet onto the truck rack or onto the cutting table or to the window opening.

The stop 43, see FIG. 9, stops the angular tilting of the mast C about its pivot 26 when the top of the mast has swung from a vertical position through a distance of about twenty-seven inches. The counterweights D will prevent the dolly from tipping over.

I claim:

1. A dolly for lifting and transporting flat sheet material and comprising:
   a. an elongated guideway for receiving the lower edge of a flat sheet for supporting the sheet;
   b. uprights disposed on one side of the elongated guideway against which the flat sheet can rest;
   c. an upwardly extending mast disposed on the same side of the guideway as said uprights;
   d. lifting means for the flat sheet material slidably mounted on said mast;
   e. said mast having its lower end pivotally mounted on said dolly so that the mast can swing in a transverse direction with respect to the length of the dolly; and
   f. counterweights mounted on the dolly for counterbalancing the weight of said mast when it is in an inclined position.

2. The combination as set forth in claim 1: and in which
   a. a standard extends upwardly from the dolly and parallels the mast and is spaced therefrom when the mast is in a vertical position;
   b. manually releasable means for securing the mast to said standard for preventing any swinging of the mast about its pivot; and
   c. a stop disposed on the dolly and positioned on the opposite side of the mast from the standard, said stop lying in the path of the swinging mast for stopping any further mast swinging in the same direction when the mast abuts said stop;
   d. whereby said stop prevents the tipping over in a lateral direction when the mast contacts the stop.

3. A dolly for lifting and transporting flat sheet material and comprising:
   a. an elongated guideway for receiving the lower edge of a flat sheet for supporting the sheet;
   b. uprights disposed on one side of the elongated guideway against which the flat sheet can rest;
   c. an upwardly extending mast disposed on the same side of the guideway as said uprights;
   d. lifting means for the flat sheet material slidably mounted on said mast;
   e. the lifting means for the flat sheet material including a frame slidably and pivotally mounted on said mast;
   f. means on said frame for engaging with the flat sheet material for lifting it when said frame is moved upwardly on said mast; and
   g. a winch and cable attached to said frame for causing the cable to move the frame when said winch is operated.

4. The combination as set forth in claim 3: and in which
   a. said mast has its lower end pivotally mounted on said dolly so that it can swing in a lateral direction so as to extend over the guideway;
   b. said cable by being attached to said frame permitting said frame to swing about its pivot in a lateral direction and to swing in the same direction as said mast;
   c. whereby the swinging of the mast and frame will permit the frame to swin beyond the side of the elongated guideway disposed opposite to said uprights and to be attached to a flat sheet of material disposed along the side of said dolly preparatory to lifting the sheet.

5. The combination as set forth in claim 3: and in which
   a. the means on said frame for engaging with the flat sheet material includes vacuum cups removably carried by said frame.

6. A dolly for lifting and transporting flat sheet material and comprising:
   a. an elongated guideway for receiving the lower edge of a flat sheet for supporting the sheet;
   b. uprights disposed on one side of the elongated guideway against which the flat sheet can rest;
   c. an upwardly extending mast disposed on the same side of the guideway as said uprights;
   d. lifting means for the flat sheet material slidably mounted on said mast;
   e. a pair of main support wheels for the dolly mounted at the dolly center and being spaced laterally from each other;
   f. caster wheels spaced equal distances longitudinally on each side of said main support wheels and either caster wheel being used with the main support wheels for a short radius turning of the dolly on the floor;
   g. the pair of main support wheels being rotatable about vertical axes and having means for securing so that their horizontal axes extend transverse to the length of the dolly for permitting the dolly to be moved in the direction of its length; and
   h. the pair of main support wheels also being swingable about their vertical axes so that their horizontal axes parallel the length of the dolly for permitting the dolly to be moved laterally in either direction, said lastnamed means securing said wheels in their second position.

7. A dolly for lifting and transporting flat sheet material and comprising:
   a. a base member movable over the floor;
   b. an upwardly extending mast pivotally supported by said base and being swingable so that the top of said mast can extend beyond one side of said base when the mast is swung into an inclined position;
   c. a winch and cable for swinging said mast about its pivot;
   d. a frame operatively connected to said mast and being connected to said cable so as to be supported thereby, said cable also raising and lowering said frame; and e. means carried by said frame for supporting a flat sheet of material.

8. A dolly for lifting and transporting flat sheet material and comprising:
   a. an elongated guideway for receiving the lower edge of a flat sheet for supporting the sheet;
   b. uprights disposed on one side of the elongated guideway against which the flat sheet can rest;
   c. an upwardly extending mast disposed on the same side of the guideway as said uprights; and
   d. lifting means for the flat sheet material slidably mounted on said mast;
   e. said mast having its lower end pivotally mounted on said dolly so that the mast can swing in a transverse direction with respect to the length of the dolly.

9. The combination as set forth in claim 7: and in which
   a. said frame has its lower end slidably and pivotally mounted on said mast;
   b. said cable being connected to the top of said frame and extending over a pulley disposed at the top of said mast;
   c. whereby said frame is free to swing about its pivot as well as to slide along said mast as the frame is moved by said cable.

* * * * *